(12) United States Patent
Nair et al.

(10) Patent No.: US 11,549,615 B2
(45) Date of Patent: Jan. 10, 2023

(54) STINGER FOR A PIPE LAYING OPERATION

(71) Applicant: J. RAY MCDERMOTT, S.A., Houston, TX (US)

(72) Inventors: Sajith Nair, Dubai (AE); Manoj Kulshrestha, Dubai (AE); Nawin Singh, Dubai (AE); Anil Kavitha, Dubai (AE)

(73) Assignee: J. Ray McDermott, S.A., Houston, TX (US)

( * ) Notice: Subject to any disclaimer, the term of this patent is extended or adjusted under 35 U.S.C. 154(b) by 190 days.

(21) Appl. No.: 17/072,754

(22) Filed: Oct. 16, 2020

(65) Prior Publication Data

US 2021/0116050 A1 Apr. 22, 2021

Related U.S. Application Data (60) Provisional application No. 62/923,092, filed on Oct. 18, 2019.

(51) Int. Cl.
*F16L 1/225* (2006.01)
*F16L 1/18* (2006.01)

(52) U.S. Cl.
CPC .............. *F16L 1/225* (2013.01); *F16L 1/18* (2013.01)

(58) Field of Classification Search
CPC ... F16L 1/225; F16L 1/205; F16L 1/23; F16L 1/235; F16L 1/207; F16L 1/18; F16L 1/19
See application file for complete search history.

(56) References Cited

U.S. PATENT DOCUMENTS

| 1,220,189 | A | 3/1917 | Chapman |
| 2,910,835 | A | 11/1959 | Timothy |
| 3,390,532 | A | 7/1968 | Benton |
| 3,438,213 | A | 4/1969 | Broussard et al. |

(Continued)

FOREIGN PATENT DOCUMENTS

| CN | 101280862 B | 7/2012 |
| CN | 205781369 U | 12/2016 |

(Continued)

OTHER PUBLICATIONS

International Search Report and Written Opinion in related application PCT/US2020/055460 dated Apr. 6, 2021.

(Continued)

*Primary Examiner* — Benjamin F Fiorello
(74) *Attorney, Agent, or Firm* — Patterson + Sheridan, LLP (57) ABSTRACT

A stinger including a first member formed from a first non-metallic material, a second body member formed from a second non-metallic material, and a plurality of cross-support members disposed between the first body member and the second body member. The first body member includes a first lower portion, a first upper portion, and a first intermediate portion disposed between the first lower portion and the first upper portion. A width of the first lower portion is greater than a width of the first intermediate portion and a width of the first upper portion, and wherein the width of the first upper portion is greater than the width of the first intermediate portion. The second body member includes a second lower portion, a second upper portion, and a second intermediate portion disposed between the second lower portion and the second upper portion.

21 Claims, 5 Drawing Sheets

(56) References Cited

U.S. PATENT DOCUMENTS

| | | | |
|---|---|---|---|
| 3,507,126 | A | 4/1970 | Rochelle et al. |
| 3,517,519 | A | 6/1970 | Kolb et al. |
| 3,538,712 | A | 11/1970 | Lochridge et al. |
| 3,559,413 | A | 2/1971 | Silverman |
| RE27,088 | E | 3/1971 | Broussard et al. |
| 3,566,609 | A | 3/1971 | Smith |
| 3,606,759 | A | 9/1971 | Lochridge |
| 3,641,779 | A | 2/1972 | Koop, Jr. et al. |
| 3,670,511 | A | 6/1972 | Gibson et al. |
| 3,685,305 | A | 8/1972 | Lloyd, III |
| 3,685,306 | A | 8/1972 | Mott |
| 3,704,596 | A | 12/1972 | Lloyd |
| 3,740,958 | A | 6/1973 | Cadwell |
| 3,822,559 | A | 7/1974 | Matthews, Jr. et al. |
| 3,901,043 | A | 8/1975 | Silvestri et al. |
| 3,911,689 | A | 10/1975 | Hogan |
| 4,015,435 | A | 4/1977 | Shaw |
| 4,030,311 | A | 6/1977 | Rafferty |
| 4,112,698 | A | 9/1978 | Lammert et al. |
| 4,257,718 | A * | 3/1981 | Rosa ............... F16L 1/225 405/166 |
| 4,273,367 | A | 6/1981 | Keeney et al. |
| 5,011,333 | A | 4/1991 | Lanan |
| 5,452,507 | A | 9/1995 | Brunner et al. |
| 5,527,134 | A | 6/1996 | Recalde |
| 5,533,834 | A | 7/1996 | Recalde |
| 5,540,169 | A | 7/1996 | Davis et al. |
| 5,823,712 | A | 10/1998 | Kalkman et al. |
| 5,971,666 | A | 10/1999 | Martin et al. |
| 6,524,030 | B1 | 2/2003 | Giovannini et al. |
| 7,581,904 | B2 | 9/2009 | Bursaux et al. |
| 7,909,538 | B2 | 3/2011 | Willis et al. |
| 8,029,210 | B2 | 10/2011 | McMillan et al. |
| 9,677,689 | B2 | 6/2017 | Feijen et al. |
| 2009/0242207 | A1* | 10/2009 | Allen ............... E21B 17/017 405/224 |
| 2010/0021237 | A1 | 1/2010 | Willis et al. |
| 2010/0040413 | A1* | 2/2010 | Whaley ............... B63C 13/00 405/2 |
| 2010/0086360 | A1* | 4/2010 | Signaroldi ............... F16L 1/18 405/166 |
| 2013/0001701 | A1 | 1/2013 | Christensen et al. |
| 2013/0017019 | A1 | 1/2013 | Bianchi et al. |
| 2013/0084135 | A1 | 4/2013 | Cruickshank |
| 2013/0115007 | A1* | 5/2013 | Cruickshank ............ F16L 1/166 405/166 |
| 2014/0147600 | A1 | 5/2014 | Neukirchen et al. |
| 2014/0270959 | A1* | 9/2014 | Lemme ............... B63C 3/02 405/1 |
| 2015/0037101 | A1* | 2/2015 | Bianchi ............... F16L 1/235 405/166 |
| 2017/0241567 | A1 | 8/2017 | Feijen et al. |

FOREIGN PATENT DOCUMENTS

| | | |
|---|---|---|
| CN | 107701802 A | 2/2018 |
| EP | 1217276 B1 | 3/2006 |
| EP | 1757770 A1 | 2/2007 |
| EP | 2167373 B1 | 1/2011 |
| EP | 2864681 B1 | 6/2016 |
| EP | 2815956 B1 | 6/2019 |
| FI | 60170 B | 8/1981 |
| FR | 2413261 A1 | 7/1979 |
| GB | 2477755 A | 8/2011 |
| GB | 2478548 A | 9/2011 |
| JP | H0735266 A | 2/1995 |
| KR | 20130065081 A | 6/2013 |
| KR | 20130068442 A | 6/2013 |
| KR | 20130098616 A | 9/2013 |
| KR | 101335249 B1 | 12/2013 |
| NL | 1031505 C2 | 10/2007 |
| WO | 2003/042495 A1 | 5/2003 |
| WO | 2010139621 A2 | 12/2010 |

OTHER PUBLICATIONS

Xu; Modeling of submarine initial pipe-laying process and its real-time semi-physical virtual reality system; Advances in Mechanical Engineering; 2018, vol. 10(1) 1-17; The Author(s) 2018; DOI: 10.1177/1687814017747734.

Bruschi et al; Pipe Technology and installation equipment for frontier deep water projects; Ocean Engineering 108 (2015) pp. 369-392.

Manitowoc's New Composite Stinger Harnesses Power of "Light", Lift and Access, (Apr. 5, 2017), Retrieved from the Internet: <https://www.liftandaccess.com/article/manitowocs-new-composite-stinger-harnesses-power-light>.

Allseas; Retrieved from the Internet: <https://allseas.com/activities/pipelines-and-subsea/pipeline-installation/>.

The Douglas Sea State Scale; Retrieved from the Internet: <http://jacksonparton.com/the-douglas-sea-state-scale>.

Installation Design; Retrieved from the Internet: <https://www.sciencedirect.com/topics/engineering/pipeline-installation>.

Bai; Subsea Pipeline Design, Analysis, and Installation 707-751, Gulf Professional Publishing (2014).

Indian Examination Report dated Aug. 25, 2022 for Application No. 202217023400.

Saudi Arabian Examination Report dated Sep. 26, 2022 for Application No. 522432292.

* cited by examiner

STINGER FOR A PIPE LAYING OPERATION

CROSS-REFERENCE TO RELATED APPLICATIONS

This application claims benefit of U.S. Provisional Patent Application Ser. No. 62/923,092, filed Oct. 18, 2019, which is herein incorporated by reference.

BACKGROUND

Field

Embodiments of the present disclosure generally relate to a stinger for a maritime pipe laying operation.

Description of the Related Art

Stingers are used in conventional pipe laying operations to lay a pipeline on a sea bed. The sea depth, the pipeline diameter, and/or the pipeline type limit the sea state in which the pipe laying operation can be conducted. Sea state refers to the wave action (e.g., wind generated waves, swell). Increased sea states may be the result of inclement weather, such as a tropical storm or a thunderstorm. The Beaufort Wind Scale, the Douglas Sea and Swell Scales, and the sea state code of the World Meteorological Organization are commonly used to define and/or describe the sea state at certain conditions. For example, rough seas can necessitate suspension of the conventional pipe laying operation because the intense wave action can damage the conventional stinger and/or the pipeline. The pipeline is laid on the seabed when the pipe laying operation is suspended, and the pipe laying vessel may return to port. To resume the pipe laying operation, the pipeline is recovered from the seabed. Suspending the operation increases the pipe laying operation costs. Suspending the operation also increases the overall amount of time needed complete the pipe laying operation.

Conventional stingers fabricated from steel. Thus, conventional stingers corrode in the presence of saltwater. Conventional stingers have a tendency to crack or fracture near an attachment point to a pipe laying vessel due to the weight of the stinger and the hydrodynamic load. The hydrodynamic load includes the wave action acting on the stinger, the buoyancy force exerted by the sea against the stinger, and the drag force exerted by the sea against the stinger. Conventional stingers are heavy, thus constant heaving in the sea can damage the stinger near the vessel attachment point. Thus, conventional stingers have high maintenance costs due to corrosion and/or damage to the stinger caused by the weight of the stinger and the hydrodynamic loads. Regular maintenance needs to be performed on conventional stingers, which reduces the stinger's availability for pipe laying operations.

Conventional stingers are difficult to move when housed in a dry dock for maintenance due to their weight. Additionally, the weight increases transportation expenses associated with the conventional stinger.

There exists a need for a stinger that can be used in higher sea states (e.g., rougher seas) without suspending pipe laying operations. There also exists a need for a lighter stinger with decreased maintenance costs.

SUMMARY

The present disclosure generally to a stinger formed from a non-metallic material and methods for completing pipe laying operations using the stinger.

In one embodiment, a stinger includes a first member formed from a first non-metallic material, a second body member formed from a second non-metallic material, and a plurality of cross-support members disposed between the first body member and the second body member, wherein the plurality of cross-support members are formed from a third non-metallic material. The first body member includes a first lower portion, a first upper portion, and a first intermediate portion disposed between the first lower portion and the first upper portion. A width of the first lower portion is greater than a width of the first intermediate portion and a width of the first upper portion, and wherein the width of the first upper portion is greater than the width of the first intermediate portion. The second body member includes a second lower portion, a second upper portion, and a second intermediate portion disposed between the second lower portion and the second upper portion.

In one embodiment, a stinger includes at least one body member consisting of a composite material made from at least one fiber and at least one polymer.

A method of constructing an underwater pipeline includes laying the pipeline from a stinger attached to a vessel. The stinger includes a first body member formed from a first non-metallic material, a second body member formed from a second non-metallic material, and a plurality of cross-support members disposed between the first body member and the second body member, wherein the plurality of cross-support members are formed from a third non-metallic material. The first body member includes a first inner chamber, a first lower portion, a first upper portion, and a first intermediate portion disposed between the first lower portion and the first upper portion. A width of the first lower portion is greater than a width of the first intermediate portion and a width of the first upper portion, and wherein the width of the first upper portion is greater than the width of the first intermediate portion. The second body member includes a second inner chamber, a second lower portion, a second upper portion; and a second intermediate portion disposed between the second lower portion and the second upper portion. A width of the second lower portion is greater than a width of the second intermediate portion and a width of the second upper portion, and wherein the width of the second upper portion is greater than the width of the second intermediate portion.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, and the disclosure may admit to other equally effective embodiments.

FIGS. 2A-2B illustrate a view of stinger.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
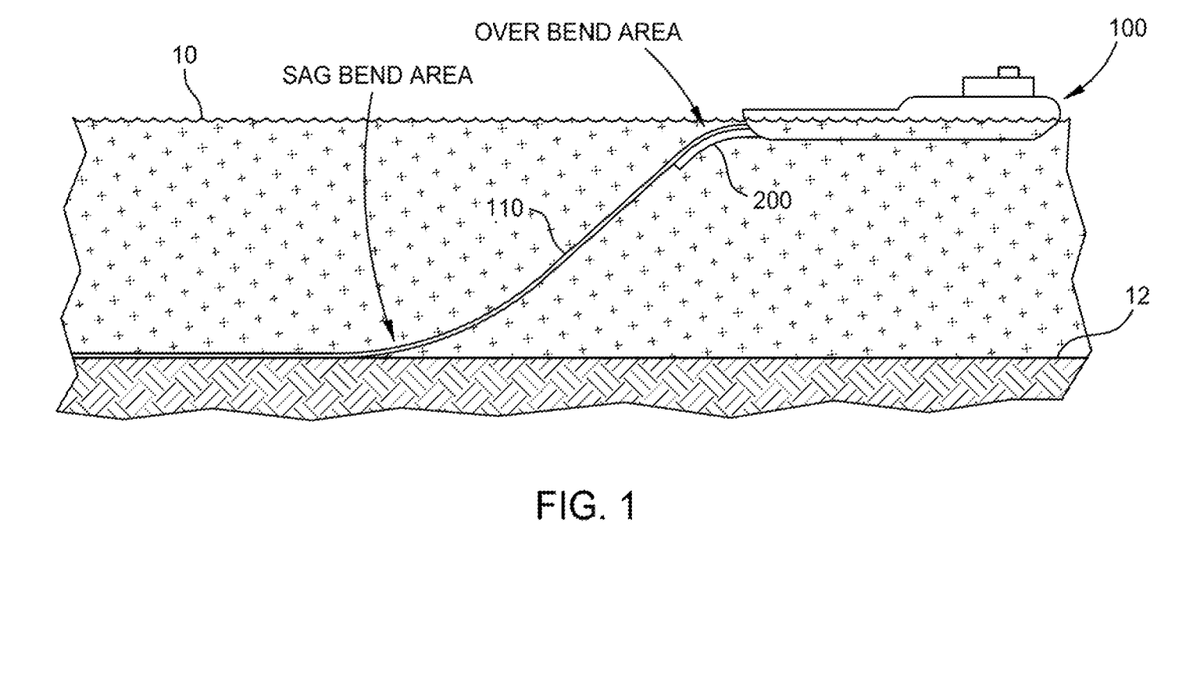
FIG. 1 illustrates a pipe laying operation, according to one embodiment.

FIG. 1 illustrates laying a pipeline 110 from a vessel 100 at sea 10 using the "S-Lay" method. A stinger 200 is coupled to the vessel 100 to facilitate laying the pipeline 110 on the sea bed 12.

The S-Lay method can be described briefly as follows. Pipe joints are transported to the installation site on the vessel 100. These pipe joints will be coupled together on the vessel 100 one at a time to form the pipeline 110. For example, the coupling between individual pipe joints may be a weld. As shown in FIG. 1, the pipeline 110 extends from the vessel 100 to the seabed 12. The pipeline 110 is supported by the stinger 200. As the pipeline 110 is laid, the pipeline 110 supported by the stinger 200 curves down toward the seabed 12. The profile of the pipeline 110, from the vessel 100 to the seabed, is in the form of a long "S" (from which comes the term S-Lay). The upper part of the profile is called the "over-bend area," and the lower part is called the "sag-bend area." The stinger 200 is subject to hydrodynamic load when in the sea. The stinger 200 will heave in response to the wave action of the surrounding sea 10.

Figure 2A:
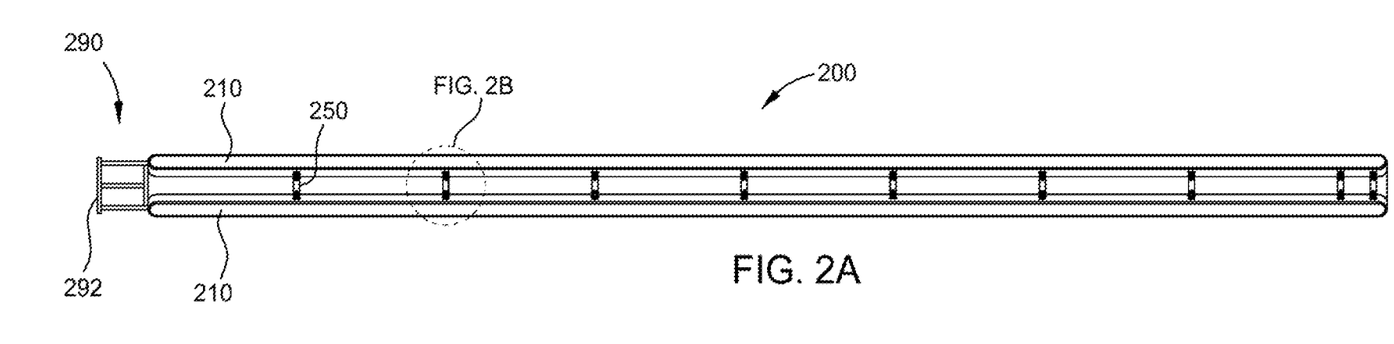
FIG. 2A is a perspective view of the stinger.

FIG. 2A illustrates a perspective view of the stinger 200. The stinger 200 has two body members 210, a plurality of cross-support members 250, a plurality of roller assemblies 260, and a vessel attachment assembly 290. The vessel attachment assembly 290 has an attachment point 292, such as a pivot pin. The stinger 200 is pivotally coupled to the vessel 100 at the vessel attachment point 292. The stinger 200 is configured to heave (e.g., move up, move down) in response to wave action relative to the vessel 100 about the attachment point 292. The vessel attachment assembly 290 is attached to the two body members 210.

Figure 2B:
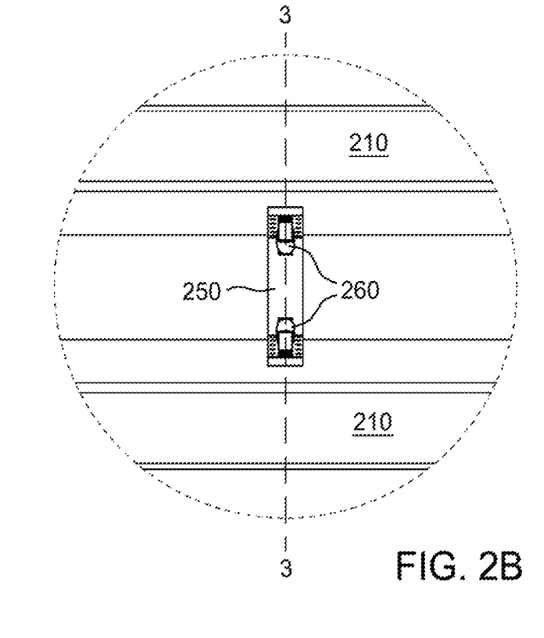
FIG. 2B illustrates an enlarged view of the region circled in FIG. 2A.

As shown in FIGS. 2A and 2B, the body members 210 are attached together by the plurality of cross-support members 250. The body members 210 are shown parallel to one another. A row of roller assemblies 260 is attached to each body member 210. As shown, each individual roller assembly 260 is paired with a roller assembly 260 in the opposite row. FIG. 2B illustrates is an enlarged view of the circled region in FIG. 2A. Each pair of roller assemblies may be disposed adjacent a respective cross-support member as shown in FIG. 2B.

Figure 3:
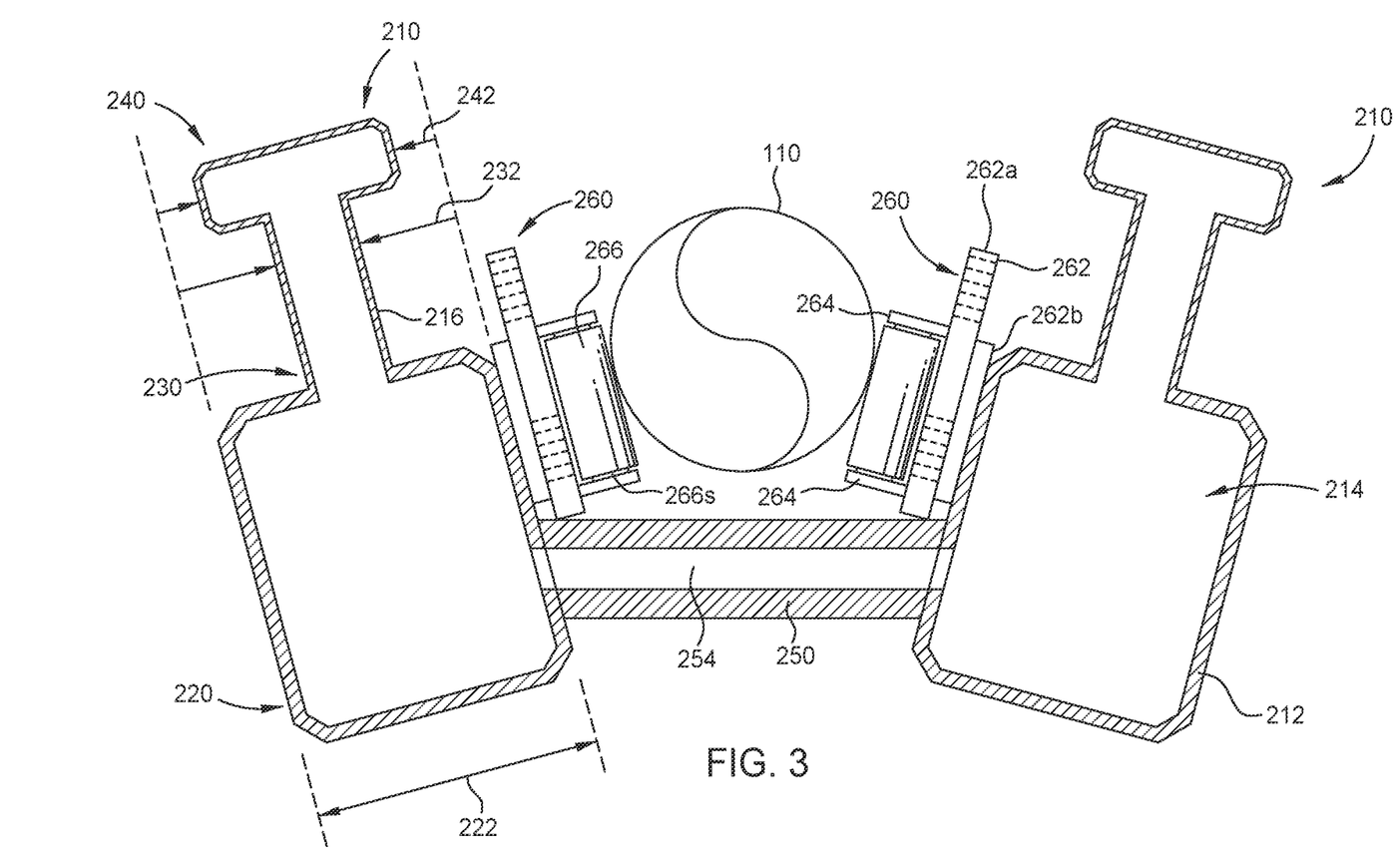
FIG. 3 illustrates a cross-sectional view of the stinger about plane 3-3 in FIG. 2.
Figure 4:
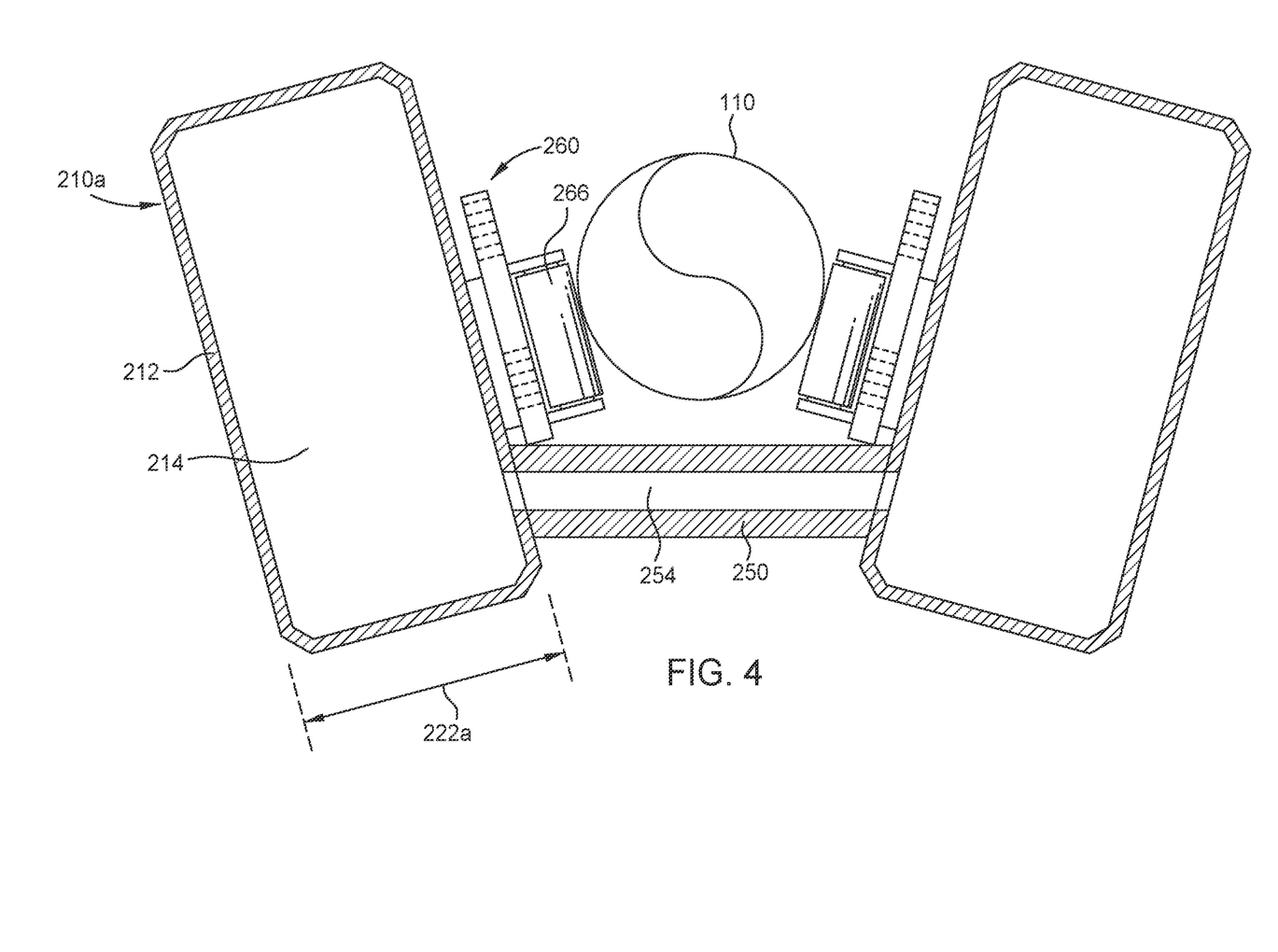
FIG. 4 is a cross-sectional view of one embodiment of the stinger.

A cross section of the stinger 200 is illustrated in FIG. 3 about the plane 3-3 in FIG. 2B. As shown, each body member 210 has a wall 212. The thickness of the wall 212 may be uniform, or the thickness may vary. The wall 212 may define an inner chamber 214 as shown in FIGS. 3 and 4. In some embodiments, the body member 210 has a solid cross-section. Each body member 210 has a lower portion 220, an intermediate portion 230, and an upper portion 240. The lower portion 220 has a width 222. The intermediate portion 230 has a width 232. The upper portion has a width 242.

As shown, the width 232 is less than the width 222, and the width 232 is less than the width 242. A recess 216 is disposed between the upper portion 240 and the lower portion 220 on both sides of the body member 210. Each recess 216 may span the entire length of the body member 210. Each recess 216 may be an aerodynamic profile. In some embodiments, the recess 216 may have contoured surfaces.

The cross-support members 250 are attached to a corresponding body member 210 at each end. The cross-support member 250 may have an inner chamber 254 to improve the buoyancy of the cross-support member 250. In some embodiments, the inner chamber 254 is in communication with the inner chamber 214 of both body members 210. For example, the two inner chambers 214 of the two body members 210 can be in fluid communication with each other via a flow path (such as the inner chamber 254) formed in at least one cross-support member 250, as shown in FIGS. 3 and 4.

The body members 210 and the cross-support members 250 are composed of a non-metallic material. The non-metallic material may be a composite material made of a fiber and a polymer, such as a glass fiber reinforced plastic ("GFRP") or a carbon fiber reinforced plastic ("CFRP"). The GFRP is made of a polymer matrix reinforced with a glass fiber. The CFRP is made of a polymer matrix reinforced with a carbon fiber. Below is a table comparing the properties of an exemplary GFRP with a CFRP at 35° C.

| | GFRP | CFRP | Steel | Applicable Standard |
|---|---|---|---|---|
| Tensile properties | 100-115 $\frac{N}{mm^2}$ | 625-910 $\frac{N}{mm^2}$ | 245 $\frac{N}{mm^2}$ | ASTM D635 |
| Impact properties | 6 J | 11 J | 27 J | ASTM D256 |
| Density | 1200-1600 $\frac{kg}{m^3}$ | 1200-1600 $\frac{kg}{m^3}$ | 7850 $\frac{kg}{m^3}$ | N/A |

The composite material may include fibers beyond a carbon fiber or a glass fiber. For example, the fiber could be an aramid, a basalt, or a wood based fiber. Polymers may be, for example, an epoxy, a vinyl ester, a polyester thermosetting plastic, or a phenol formaldehyde resin. The non-metallic material is preferably non-reactive with sea water, unlike conventional steel stingers that corrode in sea water and require constant monitoring or maintenance to manage or prevent the corrosion.

The wall 212 is formed from the non-metallic material. In some embodiments, the body members 210 and/or cross-support members 250 are a solid piece of this non-metallic material, such that the entire volume of the body member 210 and/or cross-support member is the non-metallic material. As a result, the inner chamber 214 and/or inner chamber 254 are not present.

The non-metallic material is less dense than steel. For example, the non-metallic material may have a density of about 1200 kg/m³ to about 1600 kg/m³, which is significantly less dense than steel. Thus, the body members 210 and cross-supports 250 are preferably lighter per unit length than a stinger made from a metallic material, such as steel. In addition to lower weight, the non-metallic material may have comparable or greater strength characteristics than steel or other metals. The specific modulus of the non-metallic material may be greater than the specific modulus of steel. For example, the specific modulus may be about 3 to about 5 times the specific modulus of steel. Thus, the body member 210 and/or cross-support member 250 are preferably made from a non-metallic material that is both stronger and lighter than steel. In some embodiments, the stinger 200 may be about 30% to about 40% lighter than a conventional steel stinger. In some embodiments, the stinger 200 may be greater than 40% lighter than a conventional steel stinger.

The non-metallic material is also more buoyant than steel. In conventional stingers, additional buoyancy tanks are necessary to float the stinger. The stinger 200 may be configured such that the stinger 200 floats without the aid of additional buoyancy tanks. In some embodiments, the inner chamber 214 may be filed with a buoyancy fluid such that the stinger 200 has a desired buoyancy. In some embodiments, the buoyancy of the stinger 200 can be selectively increased or decreased to a desired buoyancy during a pipe laying operation. The buoyancy of the stinger 200 may be selectively changed by increasing or decreasing the amount and/or type of the buoyancy fluid in the inner chamber 214. In some embodiments, the buoyancy fluid may be sea water.

Buoyancy force depends upon the density of the material and the volumetric displacement. Decreasing the volume of sea water displaced by the stinger 200 results in a lower buoyancy force. The buoyancy force acts on the portions of the stinger 200 partially and fully submerged in the sea water.

As shown in FIG. 3, the intermediate portion 230 and upper portion 240 have smaller cross-sectional areas than the lower portion 220. This is due, in part, to the smaller widths 232, 242 of the intermediate portion 230 and upper portion 240, respectively, as compared to the width 222. Therefore, the cross-sectional area and the volume of the body member 210 is less than if the body member 210 had a uniform width corresponding to the width 222. The body member 210 as shown in FIGS. 2A, 2B, and 3 displaces a lower volume of sea water, lowering the buoyancy force. The stinger 200, while having sufficient buoyancy to float in the sea, experiences less hydrodynamic load due to a decreased buoyancy force.

The hydrodynamic load also includes the drag force. As the vessel 100 moves the stinger 200 through the sea water, the stinger 200 will experience the drag force. Drag force is dependent upon the cross-sectional area of the object moving through the fluid. The cross-sectional area of the body member 210 as shown in FIG. 3 is less than the cross-sectional area of a body member having a uniform width equivalent to the width 222. As a result, the drag force acting on the body members 210 is decreased.

FIG. 3 illustrates an exemplary cross-section of the body member 210. Other cross-sections of the body member 210 are envisioned, and the volume and the cross-sectional area of the body member 210 can be selected to have desired drag force and/or buoyancy force minimization.

FIG. 4 illustrates an alternative cross section of the stinger 200. As shown, the stinger 200 has an alternative body member 210a. The alternative body member 210a has a uniform width 222a. The alternative body member 212a may have a wall 212 defining an inner chamber 214, such that the body member 210a may have a selectively changeable buoyancy. The buoyancy of the stinger 200 having the body member 210a may be selectively changed by increasing or decreasing the amount and/or type of the buoyancy fluid in the inner chamber 214. A stinger 200 having a uniform width 222a may be advantageous in certain applications, such as the ease of manufacture. In addition, uniform width 222a may be selected to have a desired drag force and/or buoyancy force minimization, since drag force and buoyancy force can be affected by the width.

Figure 5:
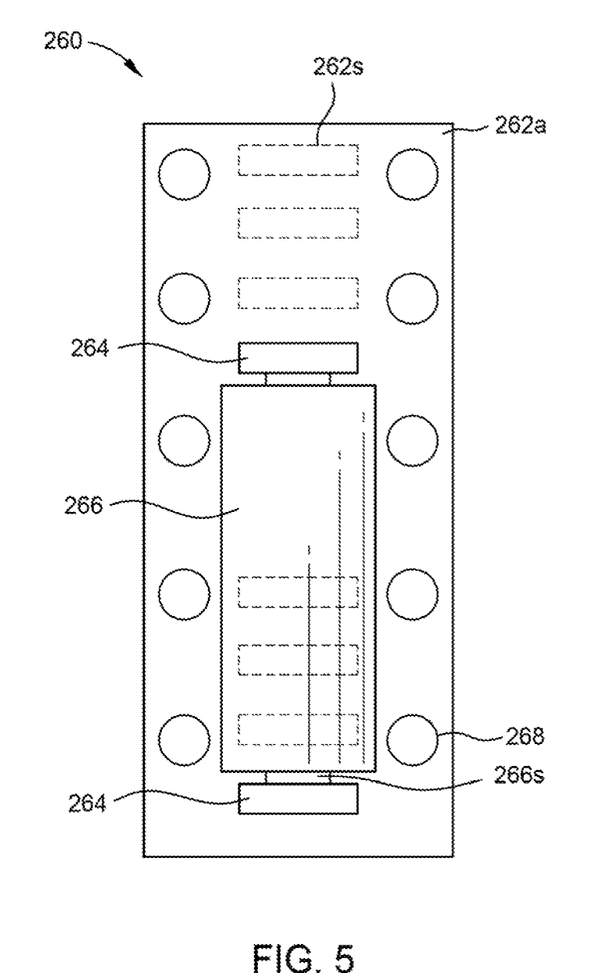
FIG. 5 illustrates a roller assembly, according to one embodiment.

FIG. 5 illustrates an exemplary roller assembly 260. A cross-section of the roller assembly 260 is shown in FIG. 3. Each roller assembly 260 has a body 262, a pair of roller attachments 264, and a roller 266. As shown in FIGS. 3 and 5, the body 262 is a first plate 262a and a second plate 262b. In some embodiments, the body 262 is formed integrally with the body member 210. In some embodiments, the body 262 is attached to the body member 210. The body 262 may be bonded to the body member 210, or the body 262 may be attached by fasteners inserted into a plurality of bores 268. In some embodiments, the fasteners are conventional fasteners, such as metallic screws and/or bolts. Each roller attachment 264 extends from the body 262. In some embodiments, the roller attachments 264 are attached to the body 262 in a corresponding slot 262s formed in the body 262. In some embodiments, the slots 262s are formed in the first plate 262a. The roller 266 has a shaft 266s. Shaft 266s is coupled at each end to one roller attachment 264. The shaft 266s may be disposed in a bearing coupled to the roller attachment 264. The rollers 266 are configured to guide and support the pipeline 110 as the pipeline 100 travels along the stinger 200. As shown in FIG. 3, the roller 266 is engaged with the surface of the pipeline 110.

The size of the roller 266 (e.g., length, diameter) may be dependent on the outer diameter of the pipeline 110. The slots 262s allow the roller attachments 264 to be moved closer or farther apart from one another to accommodate a longer or a shorter roller 266. Thus, the roller assembly 260 is configured to accommodate a variety of pipeline 110 outer diameters. A variety of pipeline 110 outer diameters can be accommodated by changing the elevation of the pipeline 110 relative to the stinger 200 using the pair of roller assemblies 260. For example, the distance between two adjacent rollers 266, the angle of the rollers 266 relative to the transverse axis of the stinger 200, and the vertical position of the rollers 266 can be chosen to accommodate a specific outer diameter of a pipeline 110.

The stinger 200 preferably has only two (i.e., a pair) roller assemblies 260 adjacent one another attached to opposing body members 210. As shown in FIG. 3, the two roller assemblies 260 are in oriented in a "V" shape. In some embodiments of the "V" shape, the rollers 266 of the two adjacent roller assemblies 260 may be angled between about 20° to about 45° relative to the transverse axis of the stinger 200. In some embodiments, an additional row of roller assemblies 260 may be disposed along the centerline of the stinger 200 to support the bottom surface of the pipeline 110. The third row of roller assemblies 260 may be attached to the cross-support members 250. The three rows of roller assemblies 260 may be oriented in a "U" shape. In some embodiments of the "U" shape, the rollers 266 of the two adjacent roller assemblies 260 may be angled between about 20° to about 45° relative to the transverse axis of the stinger 200 while the rollers 266 of the third row of roller assemblies 260 are substantially parallel to the transverse axis of the stinger 200.

The body 262, the roller attachments 264, and/or the roller 266 may be formed from a non-metallic material. In some embodiments, the body 262, the roller attachments 264, and/or the roller 266 may be formed from the same non-metallic material as the body member 210. In some embodiments, the roller attachments 264 and the rollers 266, such as the shaft 266s, may be formed from a metallic material. In some embodiments, one or both of the two plates 262a,b are formed from a metallic material.

In some embodiments, the stinger has only one body member and a plurality of roller assemblies arranged there along. The body member may have a wall, an inner chamber, a plurality of protrusions, and one or more aerodynamic profiles. The body member is formed from a non-metallic material. The buoyancy of the stinger can be selectively changed by increasing or decreasing an amount of a buoyancy fluid in the inner chamber. The protrusions are formed on an upper surface of the body member. The aerodynamic profiles may be formed on the sides and/or bottom of the body member. For example, the body member may have three or more aerodynamic profiles. The aerodynamic profiles allow for improved control of the stinger in the sea. The aerodynamic profiles may be contoured grooves. In one example, the contoured groove includes a cross-section having a plurality of lobes separated from one another by concave surfaces. The aerodynamic profiles may run the length of the body member. The roller assembles are disposed above the body member. Each roller assembly may be attached to a corresponding protrusion. Each roller assembly has three rollers in a "U" shape, with two rollers adjacent one another and the third roller between the two adjacent rollers. The two adjacent rollers may be angled between about 20° to about 45° relative to the transverse axis of the stinger while the third roller is substantially parallel to the transverse axis of the stinger. In some embodiments, the body member does not have the protrusions and the roller assemblies are attached to the upper surface of the body member. The roller assemblies may be formed, wholly or in part, from a non-metallic material.

The stinger 200 can be used to conduct pipe laying operations in higher sea states than conventional steel stingers. For example, pipe laying operations using conventional stingers might be suspended when wave heights reach about one meter in height because stress in the pipeline may exceed allowable limits 110, causing damage to the pipeline 110. The stingers 200 can be used to complete a pipe laying operation at one meter wave heights. For example, the stinger 200 may be used to complete pipe laying operations with wave heights of about 1.5 meters. In some embodiments, the stingers 200 can be used to conduct pipe laying operations with wave heights of about 1.8 meters. It is foreseeable that the stingers 200, 200a can be used when wave heights exceed 1.8 meters without suspending operations. For example, it is foreseeable that stinger 200 can be used when wave heights are about 2.5 meters. Suspensions of pipe laying operations due to overly rough seas occur less frequently since the stinger 200 can be used in sea states having increased wave heights. As a result, the pipe laying operations can be completed more quickly and with less cost than a pipe laying operation using a conventional steel stinger.

Additionally, stinger 200 requires less maintenance. The stinger 200 is corrosion resistant. The reduced weight and hydrodynamic load, in combination with the strength of the non-metallic material, reduces cracking or fracturing near the attachment point to the vessel 100. Since the stinger 200 is lighter than conventional steel stingers, the stinger 200 is easier to move around a dry dock and easier to attach to the vessel 100. The stinger is less costly to transport and to maintain.

It is foreseeable that embodiments of this stinger can be used in fresh-water environments. Therefore, the stinger embodiments disclosed herein are not limited solely to the ocean (i.e., sea).

In some embodiments, buoyancy tanks may be added to the stinger.

In some embodiments, the stinger can be formed from more than one type of non-metallic material. For example, one body member can be formed from one non-metallic material while the other body member is formed from a different non-metallic material. In some embodiments, the composite material includes more than one type of fiber and more than one type of polymer.

In some embodiments, the vessel attachment assembly 290 may be formed from a non-metallic material. In some embodiments, the vessel attachment assembly 290 is formed from a non-metallic material but for the vessel attachment point 292.

It is foreseeable that embodiments of the stinger embodiments described herein may be used with other pipe laying methods, such as the "J-Lay" method.

It is foreseeable that metallic support structures may be placed inside the body member made of the non-metallic material, such as body members 210, 210a, 1200.

In some embodiments, the stinger has a coating, such as a paint. For example, the body members may be painted to block ultra violet light.

In one embodiment, a stinger includes a first member formed from a first non-metallic material, a second body member formed from a second non-metallic material, and a plurality of cross-support members disposed between the first body member and the second body member, wherein the plurality of cross-support members are formed from a third non-metallic material. The first body member includes a first lower portion, a first upper portion, and a first intermediate portion disposed between the first lower portion and the first upper portion. A width of the first lower portion is greater than a width of the first intermediate portion and a width of the first upper portion, and wherein the width of the first upper portion is greater than the width of the first intermediate portion. The second body member includes a second lower portion, a second upper portion, and a second intermediate portion disposed between the second lower portion and the second upper portion.

A width of the second lower portion is greater than a width of the second intermediate portion and a width of the second upper portion, and wherein the width of the second upper portion is greater than the width of the second intermediate portion.

In some embodiments, the first body member has a first inner chamber and the second body member has a second inner chamber, wherein the first inner chamber is in fluid communication with the second inner chamber via a flow path formed in at least one cross-support member.

In some embodiments, the first and the second inner chambers are configured to house a buoyancy fluid.

In some embodiments, the first, second, and third non-metallic materials are a composite material made of at least one fiber and at least one polymer.

In some embodiments, the first non-metallic material is the same as the second non-metallic material.

In some embodiments, the at least one fiber is selected from the group consisting of a glass fiber, a carbon fiber, an aramid fiber, a basalt fiber, or a wood based fiber.

In some embodiments, the at least one polymer is selected from the group consisting of an epoxy, a vinyl ester, a polyester thermosetting plastic, or a phenol formaldehyde resin.

In some embodiments, the first, the second, and the third non-metallic materials are selected from the group consisting of a glass fiber reinforced plastic (GFRP) or a carbon fiber reinforced plastic (CFRP).

In some embodiments, the stinger further includes a first row of roller assemblies attached to the first body member, and a second row of roller assemblies attached to the second body member. Each roller assembly in the first row is positioned opposite a respective roller assembly of the second row, wherein each roller assembly is inclined at an angle relative to a transverse axis of the stinger.

In some embodiments, each roller bearing assembly includes a body having a plurality of slots, a first roller attachment member disposed in a first corresponding slot, a second roller attachment member disposed in a second corresponding slot, and a roller coupled to the first roller attachment member and the second roller attachment member.

In some embodiments, the stinger further includes a coating, wherein the coating is applied to an outer surface of the first body member, an outer surface of the second body member, and an outer surface of the plurality of cross-support members.

In one embodiment, a stinger includes at least one body member consisting of a composite material made from at least one fiber and at least one polymer.

In some embodiments, the at least one fiber is selected from the group consisting of a glass fiber, a carbon fiber, an aramid fiber, a basalt fiber, or a wood based fiber.

In some embodiments, the at least one polymer is selected from the group consisting of an epoxy, a vinyl ester, a polyester thermosetting plastic, or a phenol formaldehyde resin.

In some embodiments, the at least one body member is two body members and the stinger further includes a plurality of cross-support members disposed between the two body members.

In some embodiments, each body member has a lower portion, an upper portion, an intermediate portion disposed between the lower portion and the upper portion, and wherein a width of the upper portion and a width of the intermediate portion are less than a width of the lower portion.

In some embodiments, each body member has a length and includes an inner chamber, wherein the body member includes a recess spanning the length.

A method of constructing an underwater pipeline includes laying the pipeline from a stinger attached to a vessel. The stinger includes a first body member formed from a first non-metallic material, a second body member formed from a second non-metallic material, and a plurality of cross-support members disposed between the first body member and the second body member, wherein the plurality of cross-support members are formed from a third non-metallic material. The first body member includes a first inner chamber, a first lower portion, a first upper portion, and a first intermediate portion disposed between the first lower portion and the first upper portion. A width of the first lower portion is greater than a width of the first intermediate portion and a width of the first upper portion, and wherein the width of the first upper portion is greater than the width of the first intermediate portion. The second body member includes a second inner chamber, a second lower portion, a second upper portion; and a second intermediate portion disposed between the second lower portion and the second upper portion. A width of the second lower portion is greater than a width of the second intermediate portion and a width of the second upper portion, and wherein the width of the second upper portion is greater than the width of the second intermediate portion.

In some embodiments of the method of constructing the underwater pipeline, the first, second, and third non-metallic materials are a composite material made of at least one fiber and at least one polymer.

In some embodiments, the method of constructing the underwater pipeline includes selectively changing a buoyancy of the first body member and the second body member by increasing or decreasing a buoyancy fluid volume in first and second inner chambers.

In one embodiment, a stinger includes a first member formed from a first non-metallic material, a second body member formed from a second non-metallic material, and a plurality of cross-support members disposed between the first body member and the second body member. The first body member includes a first lower portion, a first upper portion, and a first intermediate portion disposed between the first lower portion and the first upper portion. A width of the first lower portion is greater than a width of the first intermediate portion and a width of the first upper portion, and wherein the width of the first upper portion is greater than the width of the first intermediate portion. The second body member includes a second lower portion, a second upper portion, and a second intermediate portion disposed between the second lower portion and the second upper portion.

While the foregoing is directed to embodiments of the present disclosure, other and further embodiments of the disclosure may be devised without departing from the basic scope thereof, and the scope thereof is determined by the claims that follow.

What is claimed is:
1. A stinger, comprising:
a first body member formed from a first non-metallic material, the first body member including:
   a first lower portion,
   a first upper portion, and
   a first intermediate portion disposed between the first lower portion and the first upper portion,
   wherein a width of the first lower portion is greater than a width of the first intermediate portion and a width of the first upper portion, and wherein the width of the first upper portion is greater than the width of the first intermediate portion;
a second body member formed from a second non-metallic material, the second body member including:
   a second lower portion,
   a second upper portion, and
   a second intermediate portion disposed between the second lower portion and the second upper portion,
   wherein a width of the second lower portion is greater than a width of the second intermediate portion and a width of the second upper portion, and wherein the width of the second upper portion is greater than the width of the second intermediate portion; and
a plurality of cross-support members disposed between the first body member and the second body member, wherein the plurality of cross-support members are formed from a third non-metallic material,
wherein the first body member has a first inner chamber and the second body member has a second inner chamber, wherein the first inner chamber is in fluid communication with the second inner chamber via a flow path formed in at least one cross-support member of the plurality of cross-support members.

2. The stinger of claim 1, wherein the first and the second inner chambers are configured to house a buoyancy fluid.

3. The stinger of claim 1, wherein the first, second, and third non-metallic materials are a composite material made of at least one fiber and at least one polymer.

4. The stinger of claim 3, wherein the at least one fiber is selected from the group consisting of a glass fiber, a carbon fiber, an aramid fiber, a basalt fiber, or a wood based fiber.

5. The stinger of claim 3, wherein the at least one polymer is selected from the group consisting of an epoxy, a vinyl ester, a polyester thermosetting plastic, or a phenol formaldehyde resin.

6. The stinger of claim 1, wherein the first non-metallic material is the same as the second non-metallic material.

7. The stinger of claim 1, wherein the first, the second, and the third non-metallic materials are selected from the group consisting of a glass fiber reinforced plastic (GFRP) or a carbon fiber reinforced plastic (CFRP).

8. The stinger of claim 1, further comprising:
a first row of roller assemblies attached to the first body member; and
a second row of roller assemblies attached to the second body member;
wherein:
each roller assembly of the first row is positioned opposite a respective roller assembly of the second row, and each roller assembly is inclined at an angle relative to a transverse axis of the stinger.

9. The stinger of claim 8, wherein each roller assembly of the first row and the second row includes:
a body having a plurality of slots;
a first roller attachment member disposed in a first corresponding slot;
a second roller attachment member disposed in a second corresponding slot; and
a roller coupled to the first roller attachment member and the second roller attachment member.

10. The stinger of claim 1, further comprising:
a coating, wherein the coating is applied to an outer surface of the first body member, an outer surface of the second body member, and an outer surface of the plurality of cross-support members.

11. A stinger, comprising:
at least one body member consisting of a composite material made from at least one fiber and at least one polymer, each of the at least one body member including an inner chamber and a wall that comprises a lower portion, an upper portion, and an intermediate portion disposed between the lower portion and the upper portion,
wherein a width of the upper portion and a width of the intermediate portion are less than a width of the lower portion, and wherein the inner chamber is defined at least partially by the lower portion, the upper portion, and the intermediate portion of the wall.

12. The stinger of claim 11, wherein the at least one fiber is selected from the group consisting of a glass fiber, a carbon fiber, an aramid fiber, a basalt fiber, or a wood based fiber.

13. The stinger of claim 11, wherein the at least one polymer is selected from the group consisting of an epoxy, a vinyl ester, a polyester thermosetting plastic, or a phenol formaldehyde resin.

14. The stinger of claim 11, wherein the at least one body member includes two body members, and the stinger further comprises a plurality of cross-support members disposed between the two body members.

15. The stinger of claim 14, wherein each body member has a length, and each body member includes a recess spanning the length.

16. The stinger of claim 14, wherein each body member has a length, and the inner chamber of each body member spans the length.

17. The stinger of claim 11, wherein the inner chamber is a single chamber defined at least partially by the lower portion, the upper portion, and the intermediate portion of the wall.

18. A method of constructing an underwater pipeline, comprising:
laying pipeline from a stinger attached to a vessel, the stinger including:
a first body member formed from a first non-metallic material, the first body member including:
a first inner chamber,
a first lower portion,
a first upper portion, and
a first intermediate portion disposed between the first lower portion and the first upper portion,
wherein a width of the first lower portion is greater than a width of the first intermediate portion and a width of the first upper portion, and wherein the width of the first upper portion is greater than the width of the first intermediate portion,
a second body member formed from a second non-metallic material, the second body member including:
a second inner chamber,
a second lower portion,
a second upper portion, and
a second intermediate portion disposed between the second lower portion and the second upper portion,
wherein a width of the second lower portion is greater than a width of the second intermediate portion and a width of the second upper portion, and wherein the width of the second upper portion is greater than the width of the second intermediate portion, and
a plurality of cross-support members disposed between the first body member and the second body member, wherein the plurality of cross-support members are formed from a third non-metallic material; and
selectively changing a buoyancy of the first body member and the second body member by increasing or decreasing a buoyancy fluid volume in the first and second inner chambers.

19. The method of claim 18, wherein the first, second, and third non-metallic materials are a composite material made of at least one fiber and at least one polymer.

20. A stinger, comprising:
a first body member formed from a first non-metallic material, the first body member including:
a first lower portion,
a first upper portion, and
a first intermediate portion disposed between the first lower portion and the first upper portion,
wherein a width of the first lower portion is greater than a width of the first intermediate portion and a width of the first upper portion, and wherein the width of the first upper portion is greater than the width of the first intermediate portion; a first row of roller assemblies attached to the first body member;
a second body member formed from a second non-metallic material, the second body member including:
a second lower portion,
a second upper portion, and
a second intermediate portion disposed between the second lower portion and the second upper portion,
wherein a width of the second lower portion is greater than a width of the second intermediate portion and a width of the second upper portion, and wherein the width of the second upper portion is greater than the width of the second intermediate portion;

a second row of roller assemblies attached to the second body member, wherein each roller assembly of the first row is positioned opposite a respective roller assembly of the second row, and each roller assembly is inclined at an angle relative to a transverse axis of the stinger; and a plurality of cross-support members disposed between the first body member and the second body member, wherein the plurality of cross-support members are formed from a third non-metallic material.

21. The stinger of claim 20, wherein each roller assembly of the first row and the second row includes:

a body having a plurality of slots;

a first roller attachment member disposed in a first corresponding slot;

a second roller attachment member disposed in a second corresponding slot; and a roller coupled to the first roller attachment member and the second roller attachment member.

\* \* \* \* \*